(12) United States Patent
Weitzel

(10) Patent No.: US 8,039,563 B2
(45) Date of Patent: Oct. 18, 2011

(54) PROCESS FOR PREPARING LATTICES STABILIZED BY POLYVINYL ALCOHOL

(75) Inventor: Hans-Peter Weitzel, Reischach (DE)

(73) Assignee: Wacker Chemie AG, Munich (DE)

( * ) Notice: Subject to any disclaimer, the term of this patent is extended or adjusted under 35 U.S.C. 154(b) by 131 days.

(21) Appl. No.: 11/600,537

(22) Filed: Nov. 16, 2006

(65) Prior Publication Data

US 2007/0112117 A1    May 17, 2007

(30) Foreign Application Priority Data

Nov. 17, 2005   (DE) .................. 10 2005 054 904

(51) Int. Cl.
*C08F 2/10* (2006.01)
*C08F 2/00* (2006.01)
*C08F 2/30* (2006.01)
*C08J 3/05* (2006.01)
*C08J 3/07* (2006.01)

(52) U.S. Cl. ............. 526/73; 526/61; 526/86; 524/503; 524/557; 524/803; 524/459

(58) Field of Classification Search ................. 524/700, 524/457, 458; 526/61, 73
See application file for complete search history.

(56) References Cited

U.S. PATENT DOCUMENTS

| | | | | |
|---|---|---|---|---|
| 6,120,638 A * | 9/2000 | Baxter et al. | ............... | 156/313 |
| 6,251,556 B1 * | 6/2001 | Yoshida et al. | ............ | 430/109.3 |
| 6,770,722 B2 * | 8/2004 | Weitzel et al. | ............... | 526/331 |
| 6,849,698 B2 * | 2/2005 | Haffner et al. | ................ | 526/61 |
| 7,439,300 B2 * | 10/2008 | Yanai et al. | .................... | 525/62 |
| 2002/0035192 A1 | 3/2002 | Weitzel | | |
| 2004/0097545 A1 | 5/2004 | Renhowe et al. | | |
| 2004/0097645 A1 * | 5/2004 | Weitzel et al. | ............... | 524/803 |
| 2007/0060702 A1 * | 3/2007 | Gao et al. | ...................... | 524/700 |
| 2009/0203832 A1 * | 8/2009 | Muller et al. | ................ | 524/557 |

FOREIGN PATENT DOCUMENTS

| | | |
|---|---|---|
| DE | 195 29 599 | 2/1997 |
| DE | 196 45 427 A1 | 5/1998 |
| DE | 198 03 098 A1 | 7/1999 |
| DE | 103 35 958 A1 | 2/2005 |
| EP | 1 420 033 A | 5/2004 |
| JP | 08170060 A | 7/1996 |
| JP | 2001514309 A | 3/1999 |
| JP | 2002105106 A | 4/2002 |
| WO | 99/11674 A | 3/1999 |

OTHER PUBLICATIONS

Wise, Donald Lee. Encyclopedic Handbook of Biomaterials and Bioengineering, vol. 2. Macrel Dekker, 1995 p. 1155.*
Saxena, S.K. Chemical And Technical Assesment, 61st JECFA, 2004.*
Rabjohn et al. Journal of Polymer Science p. 488, 1947.*
English (Espace.net) translation of DE19803098) to McKee.*
English Abstract corresponding to DE 103 35 958 A1.
Fox, T. G., "Influence of Diluent and Copolymer Composition on the Glass Temperature of a Polymer System", Bull. Am. Physics Soc. 1, 3, p. 123.
J. Wiley & Sons, Polymer Handbook, 2nd Edition, New York (1975), Chapter 6.
English Patent Abstract corresponding to DE 195 29 599 A.

* cited by examiner

*Primary Examiner* — Mark Eashoo
*Assistant Examiner* — Michael Salvitti
(74) *Attorney, Agent, or Firm* — Brooks Kushman P.C.

(57) ABSTRACT

A process for preparing polymer dispersions stabilized by polyvinyl alcohol includes a step of emulsion polymerization. The polymerization occurs such that at least 60% of the total conversion occurs at a temperature from 100° C. to 140° C.

15 Claims, No Drawings

PROCESS FOR PREPARING LATTICES STABILIZED BY POLYVINYL ALCOHOL

BACKGROUND OF THE INVENTION

1. Field of the Invention

The invention relates to a process for preparing lattices stabilized by polyvinyl alcohol, the polymer powder compositions produced therefrom, and their use in hydraulically setting systems.

2. Background Art

Polymers based on vinyl esters, vinyl chloride, (meth) acrylate monomers, styrene, butadiene and ethylene are used first and foremost in the form of their aqueous dispersions or water-redispersible polymer powders in many applications. For example such polymers are used as coatings or adhesives for a wide variety of substrates. These polymers are stabilized using protective colloids or more rarely low molecular weight surface-active compounds. Polyvinyl alcohols are generally used as protective colloids. Products formed from such polymers are used, in particular, as binders in hydraulically setting adhesives such as tile adhesives based on cements or gypsum plaster.

Dispersion powders are produced, for example, by spray drying or freeze drying of aqueous lattices. The starting materials used are dispersions which are prepared by emulsion polymerization. Typically in these processes, polyvinyl alcohols are used for stabilization. The emulsion polymerization liberates a considerable quantity of heat that has to be removed at the reactor wall via the aqueous medium and then passed to an adjacent cooling medium. Emulsion polymerization has better heat transfer behavior than bulk or solution polymerizations. Nevertheless, due to the tremendous quantity of energy, the production is subject to time restrictions in order not to allow the polymerization temperature to rise above the prescribed value as a result of insufficient heat removal. Temperatures above 100° C. are usually not intended, since such temperatures can only occur in pressure-rated reactors because of the boiling point of water. In addition, the polymerization temperature has a considerable influence on the macromolecular properties of the product and thus also on the use properties. In most cases, these properties are adversely affected by the decreasing molecular weights as the temperature increases.

DE 103 35 958 A1 describes a process for preparing polymer lattices that start the polymerization at a temperature Ts and ends it at a temperature Te. Utilization of oil-soluble initiators is essential to the invention. The dispersions described are usually emulsifier-stabilized, which is a form that is not suitable for producing dispersion powders.

SUMMARY OF THE INVENTION

It is therefore an object of the invention to develop a more economical process that efficiently removes the heat of polymerization and leads to dispersions that are suitable for producing redispersion powders.

This object is achieved by development of a process that allows polymerization at relatively high temperatures without an adverse effect on the properties of the products being observed.

An embodiment of the invention provides a process for preparing polymer dispersions stabilized by polyvinyl alcohol by emulsion polymerization. In this embodiment, at least 60% of the total conversion in the polymerization occurs at a temperature of from 100° C. to 140° C.

DETAILED DESCRIPTION OF THE PREFERRED EMBODIMENT(S)

In an embodiment of the present invention, a process for preparing polymer dispersions is provided. The process of the present embodiment produces dispersions that are stabilized by polyvinyl alcohol. The process includes a step in which the polymer dispersions are formed by emulsion polymerization wherein at least 60% of the total conversion in the polymerization occurs at a temperature of from 100° C. to 140° C.

The process of the invention surprisingly gives polymers that have only slightly lower molecular weights while having adequate use properties. Neither a particular type of initiator nor procedure for introducing such an initiator is necessary as in DE 103 35 958 A1. Instead, the polymerization can be carried out in a known manner. In particular, it is possible to use standard water-soluble initiators, since oil-soluble initiators are usually less efficient in emulsion polymerization because of poor transport via the aqueous phase. Accordingly, the great advantage of the process of the invention makes it possible to prepare the desired products significantly more economically without reductions in their quality and performance.

It has also surprisingly been found that dispersions are not obtained, or only very unstable dispersions are obtained, at temperatures above 140° C. using polyvinyl alcohol as stabilizers. There are two possible explanations for this effect. At temperatures above 140° C., hydrolysis of the usually partially hydrolyzed polyvinyl alcohol to form fully hydrolyzed polyvinyl alcohol can take place even in buffered systems. The fully hydrolyzed polyvinyl alcohol stabilizes significantly less well, as is known to those skilled in the art. In addition, the cloud point can be reached at these temperatures, depending on the type of polyvinyl alcohol used. The second explanation is that the polyvinyl alcohol precipitates completely or partly from the aqueous phase at this point and is no longer available for stabilization. Both effects may occur in combination, since fully hydrolyzed polyvinyl alcohols generally have a lower cloud point than partly hydrolyzed ones. However, since the production time for the polymerization step increases considerably at temperatures below 100° C., this temperature range is less well-suited for reasons of production economics.

Cooling capacity C is given by the equation (1). Cooling capacity is proportional to $\Delta T$ and the heat transfer coefficient HTC and also a constant H which involves, inter alia, the heat capacities. $\Delta T$ is given by equation (2). The process of and embodiment of the invention allows better heat transport into the heat-removing medium as a result of the greater $\Delta T$ between the reactor temperature Tr and the cooling water temperature Tc.

$$C = \Delta T * HTC * H \quad (1)$$

$$\Delta T = Tr - Tc \quad (2)$$

Vinyl esters suitable for the base polymer are those of carboxylic acids having from 1 to 15 carbon atoms. Preferred vinyl esters include vinyl acetate, vinyl propionate, vinyl butyrate, vinyl-2-ethylhexanoate, vinyl laurate, 1-methylvinyl acetate, vinyl pivalate, and vinyl esters of α-branched monocarboxylic acids having from 9 to 13 carbon atoms. Examples of such vinyl esters include VeoVa9R or VeoVa10R (trade names of Resolution Europe BV, Hoogvliet, The Netherlands). Most preferably, the vinyl ester is vinyl acetate.

Methacrylic esters or acrylic esters that are suitable for the base polymer are esters of unbranched or branched alcohols having from 1 to 15 carbon atoms (e.g., methyl acrylate, methyl methacrylate, ethyl acrylate, ethyl methacrylate, propyl acrylate, propyl methacrylate, n-butyl-acrylate, n-butyl methacrylate, 2-ethylhexyl acrylate, and norbornyl acrylate). Preferably, the base polymers include methyl acrylate, methyl methacrylate, n-butyl acrylate and 2-ethylhexyl acrylate.

Olefins and dienes suitable for the base polymer are ethylene, propylene and 1,3-butadiene. Suitable vinyl aromatics are styrene and vinyltoluene. A suitable vinyl halide is vinyl chloride.

In variations of the present embodiment, auxiliary monomers in an amount from 0.05 to 50% by weight based on the total weight of the base polymer, can additionally be copolymerized. In other variations of the present embodiment, auxiliary monomers from 1 to 10% by weight, based on the total weight of the base polymer, can additionally be copolymerized. Examples of auxiliary monomers include ethylenically unsaturated monocarboxylic and dicarboxylic acids (e.g., acrylic acid, methacrylic acid, fumaric acid and maleic acid); ethylenically unsaturated carboxamides and nitriles (e.g. preferably acrylamide and acrylonitrile); monoesters and diesters of fumaric acid and maleic acid (e.g., the diethyl and diisopropyl esters, and maleic anhydride), ethylenically unsaturated sulfonic acids and their salts, (e.g., vinylsulfonic acid, 2-acrylamido-2-methyl-propanesulfonic acid). Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methacrylamidoglycolate (MMAG), N-methylolacrylamide (NMA), N-methylolmethacrylamide (NMMA), allyl-N-methylolcarbamate, alkyl ethers such as the isobutoxy ethers or esters of N-methylolacrylamide, of N-methy-lolmethacrylamide and of allyl N-methylolcarbamate. Also suitable are epoxide-functional comonomers such as glycidyl methacrylate and glycidyl acrylate. Further examples are silicon-functional comonomers such as acryloxy-propyltri(alkoxy)silanes and methacryloxypropyltri-(alkoxy)silanes, vinyltrialkoxysilanes and vinylmethyldialkoxysilanes, with alkoxy groups which can be present being, for example, methoxy, ethoxy and ethoxypropylene glycol ether radicals. Mention may also be made of useful monomers having hydroxy or CO groups, for example hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate.

The process of the invention is preferably carried out using homopolymers and copolymers selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers. More preferably, the homopolymers and copolymers are vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 12 carbon atoms in the carboxylic acid radical, e.g., vinyl propionate, vinyl laurate, vinyl esters of alpha-branched carboxylic acids having from 9 to 13 carbon atoms, e.g., VeoVa9, VeoVa10, VeoVa11 from Resolution Europe BV, Hoogvliet, The Netherlands; copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers which comprise from 30 to 75% by weight of vinyl acetate, from 1 to 30% by weight of vinyl laurate or vinyl esters of an alpha-branched carboxylic acid having from 9 to 11 carbon atoms and also from 1 to 30% by weight of acrylic esters of unbranched or branched alcohols having from 1 to 15 carbon atoms, in particular n-butyl acrylate or 2-ethylhexyl acrylate, and further comprise from 1 to 40% by weight of ethylene; copolymers comprising vinyl acetate, from 1 to 40% by weight of ethylene and from 1 to 60% by weight of vinyl chloride; with the polymers being able to further comprise the auxiliary monomers mentioned in the amounts mentioned and the figures in percent by weight in each case adding up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate and, if desired, ethylene; styrene-acrylic ester copolymers comprising one or more monomers from the group consisting of methyl acrylate, ethyl acrylate, propyl acrylate, n-butyl acrylate, 2-ethylhexyl acrylate; vinyl acetate-acrylic ester copolymers comprising one or more monomers from the group consisting of methyl acrylate, ethyl acrylate, propyl acrylate, n-butyl acrylate, 2-ethylhexyl acrylate and, if desired, ethylene; styrene-1,3-butadiene copolymers; with the polymers being able to further comprise the auxiliary monomers mentioned in the amounts mentioned and the figures in percent by weight in each case adding up to 100% by weight.

The monomer and the proportions by weight of comonomers are, in general, chosen so that a glass transition temperature Tg of from −50° C. to +50° C., preferably from −30° C. to +40° C., results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956) (the entire disclosure of which is hereby incorporated by reference), Tg is given by equation (3)

$$1/Tg = x1/Tg1 + x2/Tg2 + \ldots + xn/Tgn \qquad (3),$$

where xn is the mass fraction in % by weight/100 of the monomer n and Tgn is the glass transition temperature in kelvin of the homopolymer of the monomer n. Tg values for homopolymers are listed in Polymer Handbook 2nd Edition, J. Wiley & Sons, New York (1975).

The homopolymers and copolymers are prepared by the emulsion polymerization process, with the initial polymerization temperature generally, but not necessarily being less than 100° C. At least 60% of the total conversion of the polymerization, preferably at least 70%, particularly preferably at least 80%, occurs at temperatures of from 100° C. to 140° C.

The polymerization is initiated using the water-soluble initiators or redox initiator combinations customary for emulsion polymerization. Examples of water-soluble initiators are the sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumolene hydroperoxide, isopropylbenzene monohydroperoxide, and azobisisobutyronitrile. These initiators are generally used in an amount of 0.001 to 0.02% by weight, preferably from 0.001 to 0.01% by weight, in each case based on the total weight of the monomers. As redox initiators, use is made of combinations of the initiators mentioned in combination with reducing agents. Suitable reducing agents are the sulfites and bisulfites of the alkali metals and of ammonium, for example sodium sulfite, derivatives of sulfoxylic acid, e.g., zinc formaldehydesulfoxylates or alkali metal formaldehydesulfoxylates, for example sodium hydroxylmethanesulfinate, and ascorbic acid. The amount of reducing agent is generally from 0.001 to 0.03% by weight, preferably from 0.001 to 0.015% by weight, in each case based on the total weight of the monomers.

The molecular weight may be controlled by using regulating substances during the polymerization. If regulators are used, they are usually metered in with amounts of from 0.01 to 5.0% by weight, based on the monomers to be polymerized, either separately or else premixed with reaction components. Examples of such substances include n-dodecyl mercaptan, tert-dodecyl mercaptan, mercaptopropionic acid, methyl mercaptopropionate, isopropanol and acetaldehyde.

Suitable protective colloids include polyvinyl alcohols; polyvinyl acetals; polyvinylpyrrolidones; polysaccharides in water-soluble form (e.g., starches such as amylose and amylopectin, celluloses and their carboxymethyl, methyl, hydroxyethyl, hydroxypropyl derivatives); proteins such as casein or caseinate, soy protein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonate, naphthalene-formaldehyde sulfonates, styrene-maleic acid and vinyl ether-maleic acid copolymers.

Preferably, the protective colloids include partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Hoppler viscosity in 4% strength aqueous solution of from 1 to 30 mPas (Hoppler method at 20° C. in accordance with DIN 53015: 1978-09). Also preferred are partially hydrolyzed, hydrophobically modified polyvinyl alcohols having a degree of hydrolysis of from 80 to 95 mol % and a Höppler viscosity in 4% strength aqueous solution of from 1 to 30 mPas. Examples include partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates(e.g., diisopropyl maleate and diisopropyl fumarate), vinyl chloride, vinyl alkyl ethers such as vinyl butyl ether, and olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols set forth above.

The polyvinyl alcohols have a degree of hydrolysis of from 85 to 94 mol % and a Hoppler viscosity in 4% strength aqueous solution of from 3 to 15 mPas (Hoppler method at 20° C. in accordance with DIN 53015: 1978-09). The protective colloids mentioned can be obtained by methods known to those skilled in the art and are generally added in a total amount of from 1 to 20% by weight, based on the total weight of the monomers, in the polymerization.

If the polymerization is carried out in the presence of emulsifiers, the amount of such emulsifiers is from 1 to 5% by weight, based on the amount of monomers. Suitable emulsifiers include anionic, cationic and nonionic emulsifiers. For example, useful anionic surfactants include alkylsulfates having a chain length of from 8 to 18 carbon atoms, alkyl ether sulfates or alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units. The process of the invention is preferably carried out in the absence of emulsifiers.

After conclusion of the polymerization, an after-polymerization can be carried out using known methods. Generally, after-polymerization is initiated by means of a redox catalyst, in order to remove residual monomers. Volatile residual monomers can also be removed by means of distillation, preferably under reduced pressure, and, if appropriate, with inert entrainer gases such as air, nitrogen or steam being passed through or over the polymerization mixture. The aqueous dispersions obtained in this way have a solids content of from 30 to 75% by weight, preferably from 50 to 60% by weight.

Water-redispersible polymer powder compositions can be obtained by subsequent drying of the polymer dispersions stabilized by polyvinyl alcohol made by the process of the invention. Drying can be carried out with or without addition of protective colloids as drying aids. Examples of drying methods include fluidized-bed drying, freeze drying or spray drying. The polymer powder compositions are preferably produced by spray drying of the polymer dispersions stabilized by polyvinyl alcohol which are obtained by the process of the invention.

Spray drying is carried out in customary spray drying units, with atomization being able to be effected by means of single-fluid, two-fluid or multifluid nozzles or by means of a rotating disk. The outlet temperature is generally in the range from 45° C. to 120° C., depending on the unit, Tg of the resin and the desired degree of drying. More preferably, the outlet temperature is in the range from 60° C. to 90° C. In general, the drying aid (protective colloid) is used in a total amount of from 3 to 30% by weight, based on the polymeric constituents of the dispersion. This means that the total amount of protective colloid prior to the drying step should be from 3 to 30% by weight, based on the polymer in the dispersion. Preferably, the total amount of protective colloid prior to the drying step is from 5 to 20% by weight, based on the polymer in the dispersion.

Suitable drying aids include partially hydrolyzed polyvinyl alcohols; polyvinylpyrrolidones; polysaccharides in water-soluble form, e.g., starches (amylose and amylopectin), celluloses and their carboxymethyl, methyl, hydroxyethyl, hydroxypropyl derivatives; proteins such as casein or caseinate, soy protein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers. Preference is given to using no further protective colloids other than polyvinyl alcohols as atomization aid, with the polyvinyl alcohols preferred as protective colloids also preferably being used as atomization aid.

In the atomization, a content of up to 1.5% by weight of antifoam, based on the base polymer, has frequently been found to be advantageous. In order to increase the ability of the powder to be stored by improving the blocking stability, the powder obtained can be admixed with an antiblocking agent or anticaking agent. This is particularly useful when the powders has a low glass transition temperature. Preferably, the anti-blocking agent or anti-caking agent is present in an amount of up to 30% by weight, based on the total weight of polymeric constituents. Examples of antiblocking agents include Ca carbonate and Mg carbonate, talc, gypsum, silica, kaolins, and silicates having particle sizes which are preferably in the range from 10 nm to 10 µm.

The viscosity of the feed to be atomized is set via the solids content so that the Brookfield viscosity at 20 revolutions and 23° C. is less than 500 mPas. Preferably, the viscosity at 20 revolutions less than 250 mPas. The solids content of the dispersion to be atomized is at least 35%, preferably at least 40%.

To improve the properties of the dispersion, further additives can be added during atomization. Further constituents which are present in dispersion powder compositions in preferred embodiments are, for example, pigments, fillers, foam stabilizers, hydrophobizing agents.

The water-redispersible polymer powder compositions of the invention can be used fields for such materials. For example, these powders may be used in building chemical products, in combination with hydraulically setting binders, cements (e.g., portland cement, alumina cement, pozzolanic cement, slag cement, magnesia cement, phosphate cement), gypsum plaster and water glass, for the production of building adhesives. Specific examples of such products include tile adhesives and thermal insulation adhesives, plasters and renders, knifing fillers, flooring compositions, self-leveling screeds, sealing slurries, jointing mortars and paints. Preferred applications are gunned mortar and gunned concrete for building and construction and for the lining of tunnel walls.

EXAMPLES

Dispersion D1: VAE (vinyl acetate ethylene copolymer) at 120° C., 134 kg of deionized water, 92 kg of an aqueous solution of a polyvinyl alcohol having a degree of hydrolysis of 88 mol % and a Hoppler viscosity of 4 mPas and 227 kg of vinyl acetate are placed in a pressure autoclave. The pH is set to about 4.0 by means of formic acid, and 500 g of 1% strength iron ammonium sulfate solution are then added. The autoclave is subsequently heated to 55° C. and pressurized with ethylene to a pressure of 8 bar. The polymerization is started by addition of 3% strength tert-butyl hydroperoxide solution and 5% strength ascorbic acid solution. The reaction temperature is increased to the target temperature of 120° C. with the aid of the heat of polymerization liberated. The ethylene pressure is increased with increasing temperature and is 38 bar at 85° C. and 55 bar at 120° C. On reaching 100° C., the conversion is 35%. Thirty minutes after commencement of the reaction, 57 kg of vinyl acetate and 35 kg of an aqueous solution of a polyvinyl alcohol having a degree of hydrolysis of 88 mol % and a Hoppler viscosity of 4 mPas are metered in over a period of 60 minutes. After the reaction is complete, the autoclave is cooled and residual ethylene is vented. The copolymer composition is 92% by weight of vinyl acetate and 8% by weight of ethylene.

Dispersion D2: VAE at 135° C. Analogous to example 1. However, the temperature is increased to 135° C.

Dispersion D3 (Comparative example): VAE at 150° C. Analogous to example 1. The temperature is increased to 150° C. The dispersion coagulates on cooling.

Dispersion D4 (Comparative example): VAE at 80° C. Analogous to example 1. The temperature is increased only to 80° C.

Dispersion D5: Pure acrylate at 135° C. 140 kg of deionized water, 130 kg of an aqueous solution of a polyvinyl alcohol having a degree of hydrolysis of 88 mol % and a Höppler viscosity of 4 mPas, 78 kg of butyl acrylate and 58 kg of methyl methacrylate are placed in an autoclave. The pH is set to about, 4.0 by means of formic acid, and 100 g of 10% strength iron ammonium sulfate solution are then added. The autoclave is subsequently heated to 65° C. The polymerization is started by addition of 3% strength tert-butyl hydroperoxide solution and 5% strength ascorbic acid solution. The reaction temperature is increased to the target temperature of 135° C. with the aid of the heat of polymerization liberated. On reaching 100° C., the conversion is 40%. Thirty minutes after commencement of the reaction, 78 kg of butyl acrylate and 58 kg of methyl methacrylate are metered in over a period of 60 minutes. After the reaction is complete, the autoclave is cooled. The copolymer composition is 60% by weight of butyl acrylate and 40% by weight of methyl methacrylate.

Dispersion D6 (Comparative example): Pure acrylate at 80° C. Analogous to example 5. However, the temperature is increased only to 80° C.

Dispersion D7 (Comparative Example):

Procedure is analogous to the dispersion example from DE 103 35 958 A1, pages 11 to 13, paragraphs [0064] to [0070].
Powders P1-P7

The powders are produced by spray drying the abovementioned dispersion with addition of 8% by weight of a polyvinyl alcohol having a degree of hydrolysis of 88 mol % and a Höppler viscosity of 4 mPas. The dispersion is then sprayed by means of a two-fluid nozzle. Air which is pre-compressed to 4 bar serves as the atomization component. The droplets formed are dried in countercurrent by means of air heated to 125° C. The dried powder obtained are admixed with 10% by weight of the commercial antiblocking agent calcium magnesium carbonate.

Testing:
Determination of the Powder Flow (PF):

The powder flow is assessed only visually by way of the formation of the cone formed on pouring the material.
Determination of the Blocking Resistance (BR):

To determine the blocking resistance, the dispersion powder is introduced into an iron tube having a screw cap and then loaded by means of a metal punch. After loading, the tube and contents are stored at 50° C. in a drying oven for 16 hours. After cooling to room temperature, the powder is removed from the tube and the blocking resistance is determined qualitatively by crushing the powder. The blocking resistance is classified as follows:

1-3=very good blocking resistance
4-6=good blocking resistance
7-8=satisfactory blocking resistance
9-10=no blocking resistance; powder no longer free-flowing after crushing.

Determination of the Sedimentation Behavior (RA):

The sedimentation behavior of the redispersion serves as a measure of the redispersibility of the powder. The redispersions are produced in a strength of 50% in water by application of strong shear forces. The sedimentation behavior is then determined on dilute redispersions (solids content: 0.5%). For this purpose 100 ml of this dispersion is placed in a graduated tube and the height of sedimented solid measured. The result is reported in mm of sediment after 24 hours. Values of greater than 7 indicate unsatisfactory redispersion of the powder.

The results of the testing of the powder flow (PF), the blocking resistance (BR) and the sedimentation behavior (RA) of the redispersion powders are summarized in table 1.

TABLE 1

| Example/powder | Polymerization start temperature [° C.] | BR | RA | PF |
|---|---|---|---|---|
| P1* | 120 | 3 | 1.2 | good |
| P2* | 135 | 3 | 1.5 | good |
| P3 | 150 | not measurable | not measurable | not measurable |
| P4 | 80 | 3 | 1.4 | good |
| P5* | 135 | 4 | 1.8 | good |
| P6 | 80 | 4 | 1.7 | good |
| P7 | 120 | 9 | >7 | poor |

*according to the invention

It can be seen from the data that the powder properties are very good for examples 1, 2 and 5 according to the invention. Determination of the adhesive pull strengths of a cement-containing tile adhesive modified with the redispersion powders:

The adhesive pull strengths in tile adhesives are tested in the following formulation (3% polymer content):

| | |
|---|---|
| Silica sand | 565 parts |
| Portland cement | 400 parts |
| Cellulose | 5 parts |
| Redispersion powder | 30 parts |

The adhesive pull strengths are determined after 3 storage conditions:
28d: 28 days dry storage
7d/21w: 7 days dry/21 days wet (wet storage)
14d/14d+70° C./1d: 14 days dry/14 days dry at 70° C./1 day dry
The results of the adhesive pull strength tests are summarized in table 2.

TABLE 2

| Example/powder | 28 d [N/mm²] | 7 d/21 w [N/mm²] | 14 d/14 d + 70° C./1 d [N/mm²] |
|---|---|---|---|
| P1* | 1.45 | 0.85 | 1.25 |
| P2* | 1.35 | 0.87 | 1.29 |
| P3 | not measurable | not measurable | not measurable |
| P4 | 1.39 | 0.88 | 1.22 |
| P5* | 1.15 | 0.64 | 1.10 |
| P6 | 1.10 | 0.65 | 1.05 |

*according to the invention

Owing to a lack of redispersibility, powder P7 was not tested.

The results of the tests show that even the use properties are not changed in an adverse manner by the process according to the invention in examples 1, 2 and 5.

What is claimed is:

1. A process comprising:
   a) polymerizing a composition comprising
      one or more monomers selected from the group consiting of of vinyl esters of carboxylic acids having from 1 to 15 carbon atoms, methacrylic esters or acrylic esters of unbranched or branched alcohols having from 1 to 15 carbon atoms, olefins, dienes, vinyl aromatics and vinyl chloride;
      an initiator consisting of a water soluble initiator selected from the group consisting of sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumolene hydroperoxide, and isopropylbenzene monohydroperoxide; and
      a polyvinyl alcohol, in the absence of emulsifiers other than the polyvinyl alcohol, by emulsion polymerization at a maximum polymerization temperature of 140° C. to form a polymer dispersion stabilized by polyvinyl alcohol, wherein at least 60% total conversion in the polymerization occurs at a temperature from 100° C. to 140° C., the polymerization temperature being raised to at least 120° C.; and
   b) drying of the polymer dispersion stabilized by polyvinyl alcohol to obtain a water-redispersible polymer powder composition.

2. The process of claim 1, wherein at least 70% of the total conversion of the polymerization occurs at a temperature of from 100° C. to 140° C.

3. The process of claim 1, wherein at least 80% of the total conversion of the polymerization occurs at a temperature of from 100° C. to 140° C.

4. The process of claim 1, wherein the homopolymer or copolymer are selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

5. The process of claim 4 wherein the copolymer is selected from the group consisting of:
   copolymers of vinyl acetate having 1 to 40 weight % ethylene;
   copolymers of vinyl acetate having 1 to 40 weight % ethylene and 1 to 50 weight % comonomers selected from the group consisting of vinyl esters having from 1 to 12 carbon atoms in the carboxylic acid radical and vinyl esters of alpha-branched carboxylic acids having from 9 to 13 carbon;
   copolymers of vinyl acetate having 1 to 40 weight % ethylene and 1 to 60 weight % acrylic esters of unbranched or branched alcohols having from 1 to 15 carbon atoms;
   copolymers having from 30 to 75 weight % vinyl acetate, 1 to 30 weight % vinyl laurate or vinyl esters of an alpha-branched carboxylic acid having from 9 to 11 carbon atoms and 1 to 30 weight % acrylic esters of unbranched or branched alcohols having from 1 to 15 carbon atoms, and 1 to 40 weight % ethylene; and
   copolymers of vinyl acetate having 1 to 40 weight % ethylene and 1 to 60 weight % vinyl chloride.

6. The process of claim 4 wherein the homopolymer or copolymer is selected from the group consisting of:
   (meth)acrylic ester polymers.

7. The process of claim 4 wherein the homopolymers and copolymers are formed from compositions comprising one or more monomers.

8. The process of claim 1 further comprising forming a product composition from the water-redispersible polymer powder composition.

9. The process of claim 8 wherein the product composition further comprises a component selected from the group consisting of hydraulically setting binders, cements, gypsum plaster, water glass, and combinations thereof such that the product composition is a building chemical composition.

10. The process of claim 8 wherein the product composition is a building adhesive, a tile adhesive, a thermal insulation adhesive, a plaster, a render, a knifing filler, a flooring composition, a self-leveling screed, a sealing slurry, a jointing mortar, or a paint.

11. The process of claim 8 wherein the product composition is gunned mortar or gunned concrete.

12. A process comprising:
a) polymerizing a composition comprising one or more monomers selected from the group consiting of of vinyl esters of carboxylic acids having from 1 to 15 carbon atoms, methacrylic esters or acrylic esters of unbranched or branched alcohols having from 1 to 15 carbon atoms, olefins, dienes, vinyl aromatics and vinyl chloride;
an initiator consisting of a water soluble initiator selected from the group consisting of sodium, potassium and ammonium salts of peroxodisulfuric acid, hydrogen peroxide, tert-butyl peroxide, tert-butyl hydroperoxide, potassium peroxodiphosphate, tert-butyl peroxopivalate, cumolene hydroperoxide, and isopropylbenzene monohydroperoxide; and
and a protective colloid by emulsion polymerization, wherein at least 60% of the total conversion in the polymerization occurs at a temperature of from 100° C. to 140° C. and
b) drying of the polymer dispersions stabilized by the protective colloid to obtain a water-redispersible polymer powder composition.

13. The process of claim 12 wherein the protective colloid comprises a component selected from the group consisting of:
polyvinyl alcohols;
polyvinylacetals; polyvinylpyrrolidones;
polysaccharides in water-soluble form;
ligninsulfonates;
synthetic copolymers of (meth)acrylates with carboxyl-functional comonomer units, poly(meth)acrylamide, polyvinylsulfonic acids and their water-soluble copolymers;
copolymers of melamine-formaldehyde sulfonate, naphthalene-formaldehyde sulfonates, styrene-maleic acid and vinyl ether-maleic acid.

14. The process of claim 12 wherein the protective colloid comprises a component selected from the group consisting of:
partially hydrolyzed or fully hydrolyzed polyvinyl alcohols having a degree of hydrolysis of from 80 to 100 mol %;
partially hydrolyzed polyvinyl alcohols having a degree of hydrolysis of from 80 to 95 mol % and a Höppler viscosity in 4% strength aqueous solution of from 1 to 30 mPas;
partially hydrolyzed, hydrophobically modified polyvinyl alcohols having a degree of hydrolysis of from 80 to 95 mol % and a Höppler viscosity in 4% strength aqueous solution of from 1 to 30 mPas; and
partially hydrolyzed copolymers of vinyl acetate with hydrophobic comonomers.

15. The process of claim 12 wherein the protective colloid comprises a component selected from the group consisting of:
polyvinyl alcohols having have a degree of hydrolysis of from 85 to 94 mol % and a Höppler viscosity in 4% strength aqueous solution of from 3 to 15 mPas.

* * * * *

UNITED STATES PATENT AND TRADEMARK OFFICE
CERTIFICATE OF CORRECTION

PATENT NO. : 8,039,563 B2  
APPLICATION NO. : 11/600537  
DATED : October 18, 2011  
INVENTOR(S) : Hans-Peter Weitzel Page 1 of 1

It is certified that error appears in the above-identified patent and that said Letters Patent is hereby corrected as shown below:

Column 9, Line 59, Claim 1:

After "from the group" delete "consiting of"
and insert -- consisting --.

Column 11, Line 8, Claim 12:

After "from the group" delete "consiting of"
and insert -- consisting --.

Signed and Sealed this
Tenth Day of January, 2012

David J. Kappos
*Director of the United States Patent and Trademark Office*